US006530613B2

(12) United States Patent
Uematsu et al.

(10) Patent No.: US 6,530,613 B2
(45) Date of Patent: Mar. 11, 2003

(54) AIR TWEEZER AND SUCKING PAD

(75) Inventors: Yoshio Uematsu, Fujisawa (JP); Yohtaroh Ichimura, Yokohama (JP); Tatsumi Tsuchiya, Ayase (JP); Tasushi Yoshida, Chigasaki (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/792,132

(22) Filed: Feb. 22, 2001

(65) Prior Publication Data

US 2001/0015562 A1 Aug. 23, 2001

(30) Foreign Application Priority Data

Feb. 22, 2000 (JP) ....................................... 2000-044742

(51) Int. Cl.[7] ............................. B25J 15/06; H05F 3/04
(52) U.S. Cl. ....................................... 294/64.1; 361/220
(58) Field of Search ............................... 294/64.1, 64.3; 29/740, 743, 758; 269/21; 361/212, 215, 220, 222

(56) References Cited

U.S. PATENT DOCUMENTS

| | | | | | |
|---|---|---|---|---|---|
| 3,843,183 | A | * | 10/1974 | Hutson | 294/64.1 |
| 3,880,297 | A | | 4/1975 | Martin | 214/6 |
| 3,946,484 | A | | 3/1976 | Aronstein et al. | 29/569 |
| 4,002,254 | A | | 1/1977 | Olofsen | 214/200 |
| 4,009,785 | A | | 3/1977 | Trayes | 214/1 |
| 4,029,351 | A | | 6/1977 | Apgar et al. | 294/64 |
| 4,257,637 | A | | 3/1981 | Hassan et al | 294/64 |
| 4,474,397 | A | | 10/1984 | Hassan et al. | 204/64 |
| 4,566,726 | A | | 1/1986 | Correnti et al. | 294/64.3 |
| 4,735,449 | A | | 4/1988 | Kuma | 294/64.3 |
| 4,969,676 | A | | 11/1990 | LaMagna | 294/64.3 |
| 4,995,662 | A | * | 2/1991 | Hawkswell | 294/64.1 |
| 5,067,762 | A | | 11/1991 | Akashi | 294/64.3 |
| 5,080,549 | A | | 1/1992 | Goodwin et al. | 414/744.8 |
| 5,106,139 | A | * | 4/1992 | Palmer et al. | 294/64.1 |
| 5,118,153 | A | * | 6/1992 | Allison et al. | 294/64.1 |
| 5,169,196 | A | | 12/1992 | Safabakhsh | 294/64.3 |
| 5,270,889 | A | | 12/1993 | Muratomi | 360/103 |
| 5,280,979 | A | * | 1/1994 | Poli et al. | 294/64.1 |
| 5,370,709 | A | | 12/1994 | Kobayashi | 29/25.01 |
| 5,374,090 | A | * | 12/1994 | Goff | 294/64.1 |
| 5,511,840 | A | * | 4/1996 | Allison et al. | 294/64.1 |
| 5,871,814 | A | | 2/1999 | Livshits | 427/294 |
| 5,928,537 | A | * | 7/1999 | Fortune | 294/64.1 X |
| 5,967,578 | A | | 10/1999 | Frey | 294/64.3 |
| 6,099,056 | A | | 8/2000 | Siniaguine et al. | 294/64.3 |

FOREIGN PATENT DOCUMENTS

| | | | | |
|---|---|---|---|---|
| DE | 2704981 | * | 5/1978 | 294/64.1 |
| JP | 136755 | * | 6/1986 | 294/64.1 |
| JP | 287638 | * | 12/1987 | 294/64.1 |
| JP | 5-211226 | | 8/1993 | |
| JP | 9-129587 | | 5/1997 | |
| JP | 9-269221 | | 10/1997 | |
| WO | 8904547 | * | 5/1989 | 294/64.1 |

OTHER PUBLICATIONS

Garnache R.R., "Automatic Wafer Loader", IBM Technical Disclosure Bulletin, vol. 14, No. 8, Jan. 1972, p. 2478.

* cited by examiner

*Primary Examiner*—Johnny D. Cherry
(74) *Attorney, Agent, or Firm*—Douglas R. Millett

(57) ABSTRACT

An air tweezer capable of efficiently performing an operation in which an article with a very small size, such as a pico slider or a femto slider, is sucked and set at a predetermined position of a suspension, and having countermeasures against ESD.

7 Claims, 4 Drawing Sheets

AIR TWEEZER AND SUCKING PAD

FIELD OF THE INVENTION

The present invention relates to an air tweezer and, more particularly, to an air tweezer that is suitable when an operation is performed in which a slider with a magnetic head used for a hard disk drive is sucked to be attached to a head suspension.

DESCRIPTION OF RELATED ART

A slider with a magnetic head is fixed to a head suspension with an adhesive. However, since it is not easy to set the slider directly at a predetermined position of the head suspension, a method is used in which the slider is bonded to the predetermined position of the head suspension using a bonding jig. More specifically, a jig is used which has a mechanism having a position for mounting the slider and is capable of holding the head suspension and causing the slider bonding position of the head suspension to coincide with the position for mounting the slider.

The operation using this jig consists of a process in which the slider is first positioned at the slider mounting position of the jig. The slider is bonded by using the aforementioned mechanism to the head suspension to which an adhesive is applied. The slider is positioned at the slider mounting position of the jig by the sucking of an air tweezer. This operation is performed under a microscope because the slider is very small. Therefore, the air tweezer is required to be designed considering the operation under a microscope.

A magnetic head is used for a hard disk drive; a GMR (Giant Magneto Resistive) head has been used in recent years. The GMR head is a head capable of dramatically increasing magnetic recording density as compared with a conventional MR (Magneto Resistive) head. The size of the slider incorporating the GMR head has decreased; the size has transferred from about 2 mm×1.5 mm called a nano slider size to about 1.3 mm×1 mm called a pico slider size. Also, a slider with a size of 1 mm×0.5 mm, which is called a femto slider, has been studied for the future.

The GMR head is more sensitive to electro-static discharge (ESD) than the MR head. If a slider is sucked by an air tweezer and is brought into contact with the suspension, ESD occurs, by which the GMR head may be damaged.

However, the conventional air tweezer has not been sufficient to devise countermeasures against ESD as well as to suck an article with a very small size, such as a pico slider or a femto slider.

Accordingly, an object of the present invention is to provide an air tweezer capable of efficiently performing an operation in which an article with a very small size, such as a pico slider or a femto slider, is sucked and set at a predetermined position of a suspension. Another object of the present invention is to provide an air tweezer having countermeasures against ESD.

SUMMARY OF THE INVENTION

The present invention provides an air tweezer comprising a tweezer body to be gripped during operation; a metal tube attached to the tweezer body, the metal tube having a sucking passage; and a sucking pad attached to the distal part of the metal tube, the sucking pad having an aperture communicating with the sucking passage, the air tweezer sucking an article by operating a suction force at the sucking passage of the metal tube and by contacting the sucking pad with the article, wherein the sucking pad is formed of an elastic material, the elastic material including a conductive route. The air tweezer in accordance with the present invention can be configured so that the sucking pad and the metal tube are electrically connected to one another, and the metal tube is grounded. Thereby, a slider can be sucked reliably, and electrostatic destruction of a magnetic head can be prevented because electrical ground can be provided through the sucking pad and the metal tube even if static electricity is generated. An elastic material including the conductive route, for example, rubber in which C (carbon) powder of an amount enough to form the conductive route is dispersed, can be used. Further, the sucking pad preferably has a cross-sectional area decreasing toward a sucking face.

Also, the present invention provides an air tweezer comprising a tweezer body to be gripped during operation; a tube assembly attached to the tweezer body, the tube assembly having a sucking passage; and a sucking pad attached to the distal part of the tube assembly, the sucking pad having an aperture communicating with the sucking passage, the air tweezer sucking an article by operating a suction force at the sucking passage of the tube assembly and by contacting the sucking pad with the article, wherein the tube assembly comprises an outer tube extending over almost the overall length of the tube assembly; and an inner tube set on the distal part side in the outer tube, the outer diameter of the inner tube being smaller than the inner diameter of the outer tube, whereby the sucking pad is held between the outer tube and the inner tube.

According to this air tweezer, the sucking pad is held between the outer tube and the inner tube. That is, the sucking pad is in contact with both of the outer tube and the inner tube. Therefore, if the aforementioned elastic material including the conductive route is used as the sucking pad, the contact area can be increased as compared with the case where the sucking pad is in contact with either the outer tube or the inner tube, i.e., electrical resistance can be decreased, which is effective in taking countermeasures against ESD.

In the air tweezer in accordance with the present invention, a stopper tube for inhibiting axial movement of the inner tube is fitted in the outer tube and fixed thereto, and the stopper tube abuts on the inner tube, whereby axial movement of the inner tube can be inhibited, and a conductive route can be formed by the stopper tube and the inner tube.

Also, in the above-described air tweezer in accordance with the present invention, the sucking pad has conductivity, and the sucking pad is held between the outer tube and the inner tube, whereby a conductive route is formed between the sucking pad and the outer tube and between the sucking pad and the inner tube.

Further, the present invention provides an air tweezer comprising a tweezer body to be gripped during operation; a metal tube attached to the tweezer body, the metal tube having a sucking passage; and a sucking pad attached to the distal part of the metal tube, the sucking pad having an aperture communicating with the sucking passage, the air tweezer sucking an article by operating a suction force at the sucking passage of the metal tube and by contacting the sucking pad with the article, wherein the tweezer body has a bracket, the bracket being electrically connected to the metal tube, and the bracket being connected to a ground circuit.

In the air tweezer in accordance with the present invention, the bracket preferably supports the metal tube. Also, the metal tube is preferably bent at a predetermined position, and the metal tube is preferably supported by the bracket toward the bent direction of the metal tube.

Further, the present invention provides a sucking pad for sucking an article by operating a suction force at the article, comprising a matrix phase formed of an elastic material; and a conductive material phase forming a conductive route at the matrix phase. In this sucking pad, the matrix phase is preferably formed of a rubber material, and the conductive material phase is preferably formed of carbon powder.

As described above, according to the air tweezer in accordance with the present invention, an operation in which a very small article, such as a pico slider or a femto slider, is sucked and set at a predetermined position of a suspension can be performed efficiently. Also, according to the present invention, an air tweezer having countermeasures against ESD can be provided.

DETAILED DESCRIPTION OF THE PREFERRED EMBODIMENT

The present invention will now be described with reference to an embodiment.

Figure 1:
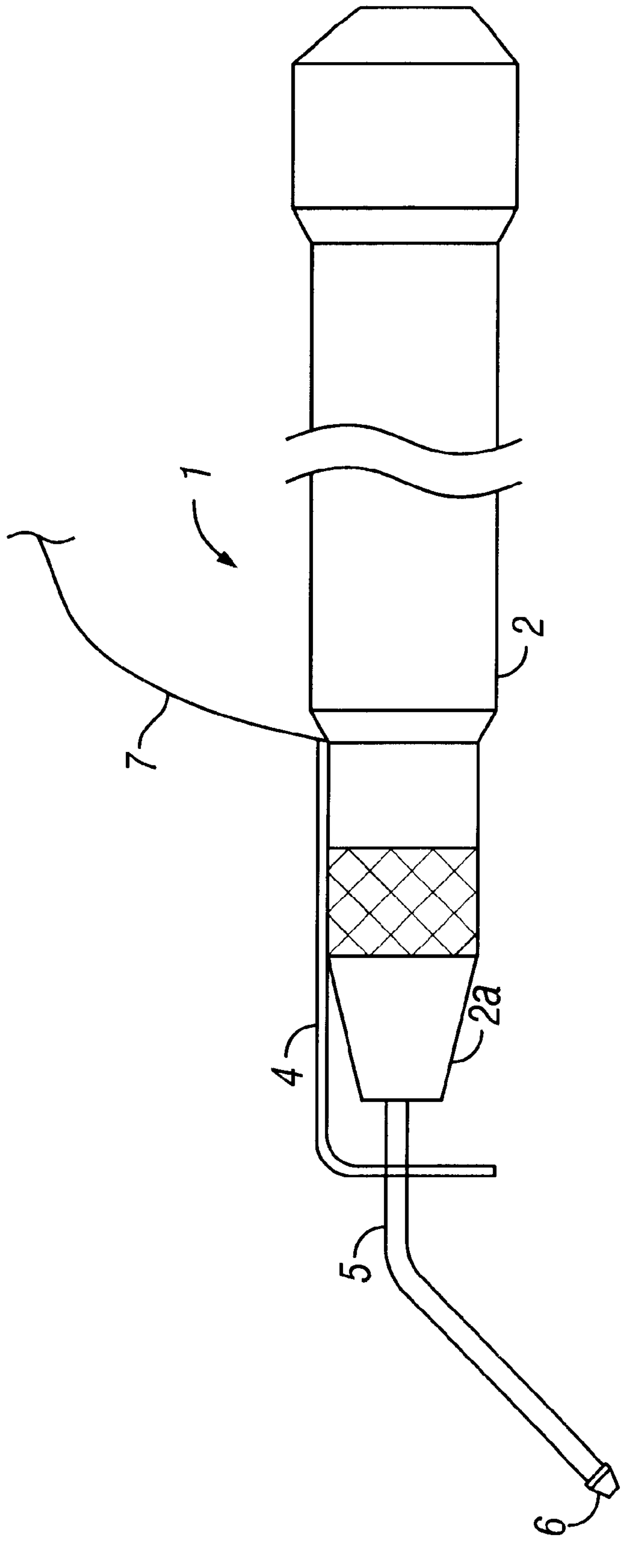
FIG. 1 is a general view of an air tweezer in accordance with an embodiment.
Figure 2A:
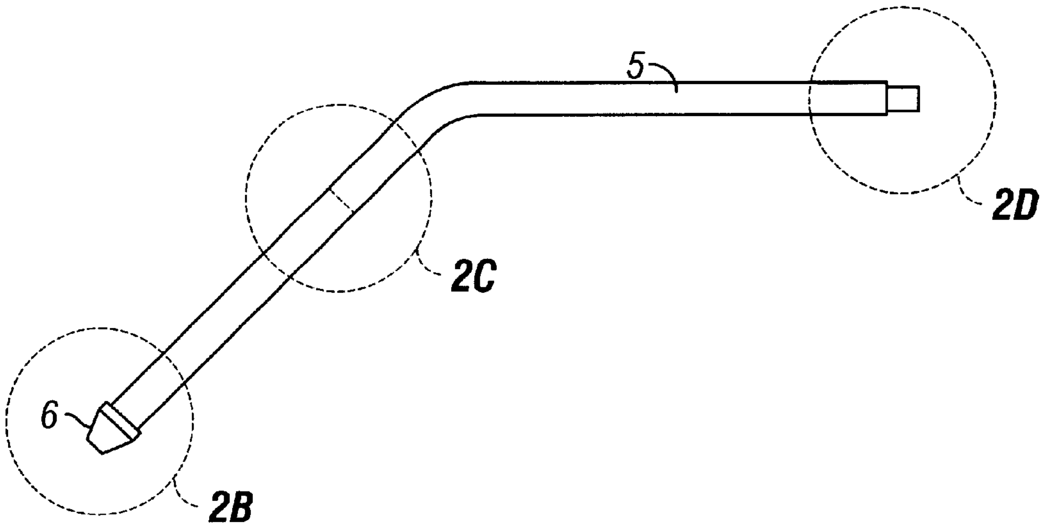
FIGS. 2A,B,C, and D are views for illustrating the construction of a tube assembly for an air tweezer in accordance with an embodiment.
Figure 2C:
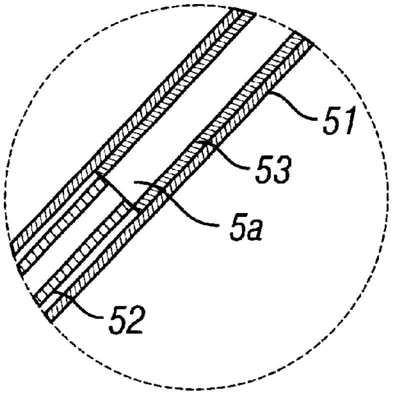
Figure 2B:
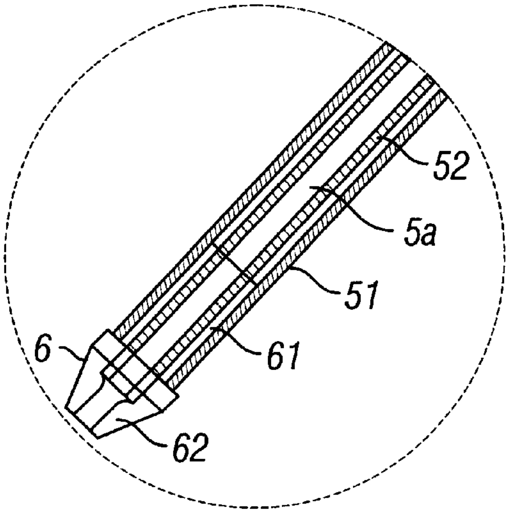
Figure 2D:
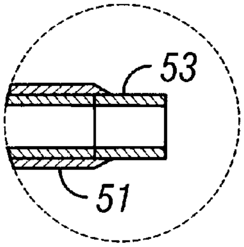

FIG. 1 is a general view of an air tweezer in accordance with the embodiment. As shown in FIG. 1, an air tweezer 1 includes a tweezer body 2, a coupler 2*a* attached detachably to the distal part of the tweezer body 2, an ESD bracket 4 fixed to the coupler 2*a*, a tube assembly 5 projecting from the coupler 2*a*, and a sucking pad 6 attached to the distal part of the tube assembly 5. The coupler 2*a* has a function of attaching the tube assembly 5 to the tweezer body 2, and is dealt with as a component of the tweezer body 2 in the present invention. When an operation is performed by using the air tweezer 1, an operator sucks an article such as a slider with a sucking pad 6 at the distal part of the tube assembly 5 while gripping the tweezer body 2. The ESD bracket 4 is connected with a ground circuit 7.

The tweezer body 2 has a pen shape so that the operator can grip the same easily. The air tweezer 1 can be of a type such that a vacuum generator is incorporated in the tweezer body 2. For example, an air tweezer VTA or VTB of PISCO is of this type. It is a matter of course that the present invention is not limited to this type, and the air tweezer 1 can be of a type such that the air tweezer 1 is connected to a vacuum generating source prepared separately.

The sucking pad 6 is a portion that comes directly into contact with a slider, which is an article to be sucked. The sucking pad 6 requires that it not damage the slider, that it not develop vacuum leakage when sucking the slider, that it creates proper frictional force for preventing suction deviation when positioning the slider by pressing it at a necessary position while sucking it, and that it has countermeasures against ESD. To meet these requirements, the sucking pad 6 in accordance with this embodiment is formed of butadiene rubber that can form a conductive route by dispersing C (carbon) powder, which is a conductive substance. The butadiene rubber, which has a proper elastic force, neither damages the slider nor causes suction leakage and suction deviation. Also, since the conductive route is formed by C powder, countermeasures against ESD can be taken. Needless to say, this is an example, and does not restrict the present invention.

Figure 3:
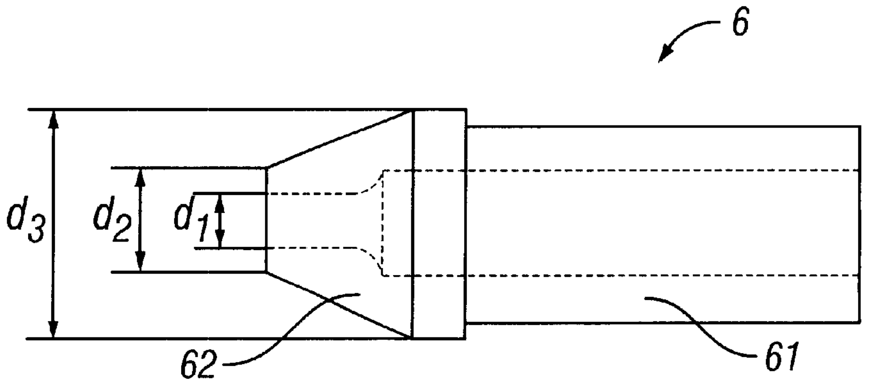
FIG. 3 is a view showing a sucking pad of an air tweezer in accordance with an embodiment.

FIG. 3 is a side view of the sucking pad 6. The sucking pad 6 consists of a holding portion 61 and a sucking portion 62. The holding portion 61 and the sucking portion 62 are formed with a through hole, which communicates with a sucking passage in the tube assembly 5, described later. The sucking portion 62 has a truncated cone shape such that the diameter decreases toward a sucking face at the distal part thereof.

Since the slider setting work is performed under a microscope as described before, in order to set a slider at a predetermined position with high accuracy, it is necessary for the operator to observe the slider sucked to the distal part of the sucking pad 6 through the microscope. For this purpose, the sucking face of the sucking pad 6 must be smaller than the slider. On the other hand, to increase the durability of the sucking pad 6, the thickness (in the axial direction) and the diameter of the sucking pad 6 are preferably larger.

To meet these contradictory requirements, in this embodiment, the sucking portion 62 has a truncated cone shape such that the diameter thereof on the side of the holding portion 61 is large, but the cross-sectional area decreases toward the sucking face. Specifically, the sucking pad 6 can have typical dimensions of $d_1$=0.4 mm, $d_2$=0.8 mm, and $d_3$=1.3 mm. Since the pico slider has a dimension of 1.3 mm×1 mm as described before, it can be sucked by the sucking pad 6 and also can be observed under a microscope.

FIG. 2 shows the details of the tube assembly 5 to which the sucking pad 6 is attached.

The tube assembly 5 is made up of an outer tube 51, an inner tube 52, and a stopper tube 53. All of the outer tube 51, inner tube 52, and stopper tube 53 are formed of stainless steel.

The tube assembly 5 connects the sucking pad 6 to the coupler 2*a*, and has a function of transmitting an applied suction force. Therefore, the tube assembly 5 is provided with a sucking passage 5*a*. Also, the tube assembly 5 is bent into a chevron shape. This is because the workability in a state in which the operator grips the air tweezer 1 is high as compared with the case where the tube assembly 5 has a straight-line shape. In this embodiment, the side on which the sucking pad 6 is attached to the tube assembly 5 is referred to as a distal part of the tube assembly 5, and the side on which the tube assembly 5 is connected to the coupler 2*a* is referred to as a proximal end thereof (see FIG. 1).

The outer tube 51 extends over almost the overall length of the tube assembly 5. On the distal part side of the tube assembly 5 in the outer tube 51 is set the inner tube 52 whose outer diameter is smaller than the inner diameter of the outer tube 51. The holding portion 61 of the sucking pad 6 is inserted into a gap between the outer tube 51 and the inner tube 52 and is held between them. Specifically, when the outer tube 51 and the inner tube 52 are set coaxially, a gap is formed between the inner periphery of the outer tube 51 and the outer periphery of the inner tube 52. On the other hand, the sucking portion 62 of the sucking pad 6 has a tubular shape. Therefore, if the sucking portion 62 is inserted into the gap, the sucking pad 6 is held.

The stopper tube 53 is also set in the outer tube 51. One end of the stopper tube 53 is welded to the outer tube 51 at the proximal end of the tube assembly 5. Therefore, the stopper tube 53 is fixed axially in the outer tube 51. The other end of the stopper tube 53 abuts on the inner tube 52 in the outer tube 51, so that unnecessary axial movement of the inner tube 52 is regulated. Although axial movement of the inner tube 52 is regulated by the stopper tube 53 in this embodiment, a single tube provided with portions having different inner diameters can be used.

In order for the stopper tube 53 to perform a function as a stopper with respect to the inner tube 52, the inner diameter of the stopper tube 53 must be smaller than the outer diameter of the inner tube 52. Also, the outer diameter of the stopper tube 53 coincides with the inner diameter of the outer tube 51, so that a construction is provided in which the stopper tube 53 is fitted into the outer tube 51 (the intended shape is assumed in the fitted state).

Figure 4A:
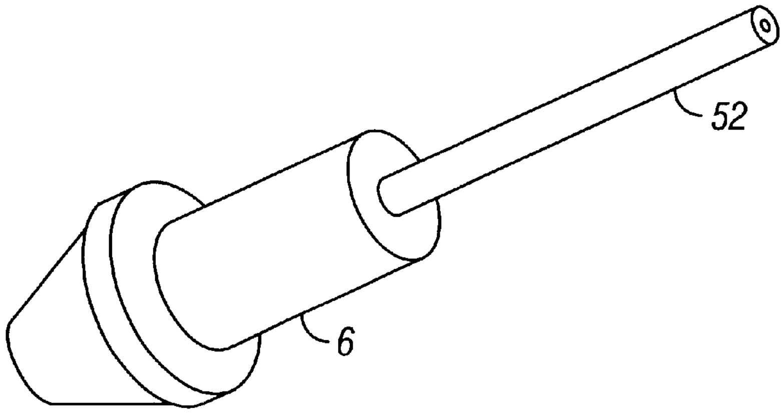
FIGS. 4A and B are views for showing a state in which a sucking pad of an air tweezer in accordance with an embodiment is assembled to an inner tube thereof.
Figure 4B:
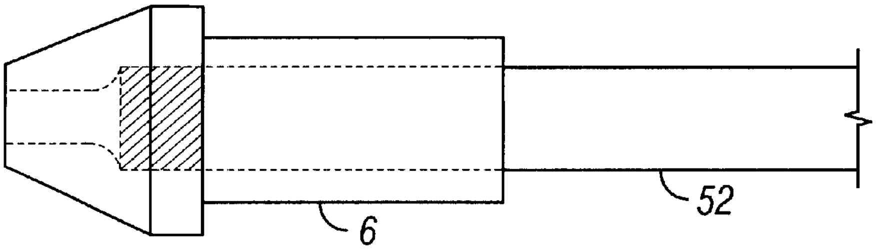

FIG. 4 is a perspective view and a sectional view showing a state in which the sucking pad 6 is attached to the inner tube 52. By the construction in which the inner tube 52 is fitted into the sucking pad 6, the rigidity of the sucking pad 6 is increased. In particular, a construction in which the distal part of the inner tube 52 is inserted up to the sucking portion 62 of the sucking pad 6 as shown in the sectional view is effective in preventing the sucking pad 6 from being buckled. Specifically, when a slider is positioned by being pressed on an end face of a bonding jig, a force is applied in the direction parallel with the bonding jig. Therefore, the sucking pad 6 is subjected to a force in the direction in which the sucking pad 6 is buckled by a reaction force generated by the aforementioned force. If the distal part of the inner tube 52 is inserted up to the sucking portion 62 of the sucking pad 6 as shown in FIG. 4, however, the insertion portion resists the buckling. However, if the distal part of the inner tube 52 is inserted too deep into the sucking pad 6, the flexibility of the sucking pad 6 is lost, so that the suction of slider may be hindered. It is necessary to determine the insertion dimension so that not only the rigidity for preventing buckling is provided but also the sucking property is ensured.

To assemble the tube assembly 5, the sucking pad 6 is first attached to the inner tube 52 as shown in FIG. 4. On the other hand, the stopper tube 53 is inserted into the outer tube 51, and the proximal end of the stopper tube 53 is fixed by welding. The inner tube 52 to which the sucking pad 6 is attached is inserted from the distal part of the outer tube 51 to which the stopper tube 53 is fixed. By inserting the inner tube 52 until the sucking portion 62 of the sucking pad 6 abuts on the distal part of the outer tube 51, the tube assembly 5 shown in FIG. 2 can be assembled.

After the inner tube 52 is inserted, the tube assembly 5 is bent into a chevron shape. When a slider is sucked under a microscope, it is desirable that the tube assembly 5 be bent to an angle such that the sucking face of the sucking pad 6 is in parallel with the slider in a state in which the operator holds the air tweezer 1.

Since the tube assembly 5 includes the outer tube 51, inner tube 52, and stopper tube 53 in combination, and is bent into a chevron shape, it has proper elasticity. When the slider sucked by the air tweezer 1 is pressed on the bonding jig to be positioned, the tube assembly 5 is deflected by the pressing force. Therefore, even if there is a difference in the pressing force between individual operators, the difference is absorbed by the deflection, that is, the elasticity of the tube assembly 5. Thus, the tube assembly 5 also has a function of keeping the force by which a slider is pressed on the bonding jig constant. If the sucking pad 6 deteriorates, the sucking pad 6 is drawn together with the inner tube 52 from the tube assembly 5. After the deteriorating sucking pad 6 is removed from the inner tube 52, a new sucking pad 6 is attached to the inner tube 52, and is inserted into the tube assembly 5. That is to say, the tube assembly 5 of this embodiment has a feature such that the sucking pad 6 is attached and detached easily.

The tube assembly 5 has a construction in which the countermeasures against ESD are considered.

As shown in FIG. 2, the holding portion 61 of the sucking pad 6 is in contact with both of the outer tube 51 and the inner tube 52. Also, the inner tube 52 abuts on the stopper tube 53. Further, the stopper tube 53 is fitted in the outer tube 51. As described above, all of the outer tube 51, inner tube 52, and stopper tube 53 are formed of stainless steel, and the sucking pad 6 contains C powder as a conductive material to provide conductivity as a whole.

Thereupon, the sucking pad 6 is electrically connected to the outer tube 51 and the inner tube 52. Also, the inner tube 52 and the stopper tube 53 are electrically connected to one another, and the stopper tube 53 and the outer tube 51 are electrically connected to one another. Therefore, the inner peripheral surface of the holding portion 61 of the sucking pad 6 is electrically connected to the inner tube 52. Also, the tube assembly 5 is bent into a chevron shape as described above, so that electrical connection between the outer tube 51 and the stopper tube 53 is effected reliably by this bend. On the other hand, the outer peripheral surface of the holding portion 61 of the sucking pad 6 is connected directly to the outer tube 51, so that these are also connected electrically to one another. Therefore, both of the outer tube 51 and the inner tube 52 provide a conductive route to the suction pad 6, so that this configuration has low electrical resistance as compared with a case where any one of the tubes is in contact with the suction pad 6, which is effective for the countermeasures against ESD. If the length of the holding portion 61 of the sucking pad 6 is increased, the contact area between the outer tube 51 and the inner tube 52 increases, which is more effective for the countermeasures against ESD.

The ESD bracket 4 has both of a function of mechanically supporting the tube assembly 5 and reinforcing the same against deflection and a function of electrically connecting the tube assembly 5 to the ground circuit 7.

Figure 5A:
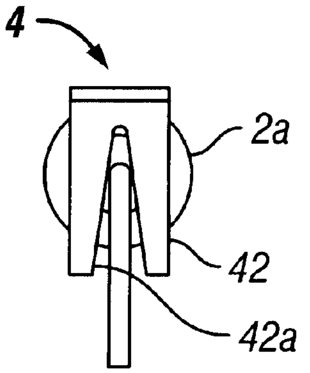
FIGS. 5A and 5B are views showing a coupler and an ESD bracket of an air tweezer in accordance with an embodiment.
Figure 5B:
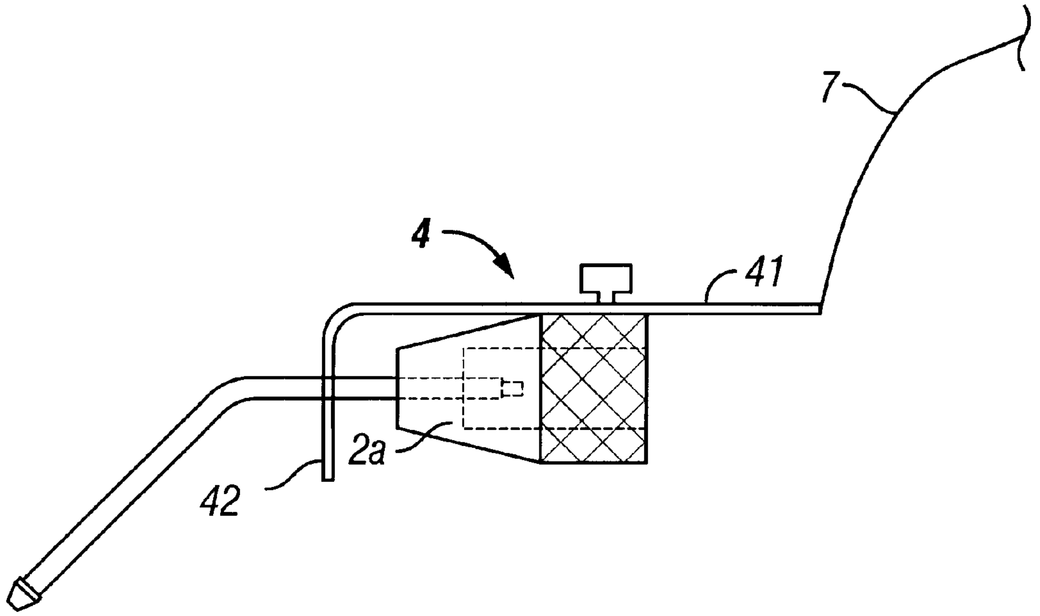

As shown in FIG. 5, the ESD bracket 4 is formed of a metallic flat plate bent into an L shape, and is made up of a fixing portion 41 and a tube support portion 42. The ESD bracket 4 is fixed to the coupler 2*a* via the fixing portion 41. The ESD bracket 4 is fixed to the coupler 2*a* so as to be electrically connected to the coupler 2*a* formed of, for example, stainless steel. For example, soldering, welding, or bolting may be used for the fixture. To the end of the fixing portion 41 is connected the ground circuit 7.

The tube support portion 42 of the ESD bracket 4 is formed with a U-shaped groove 42*a*, and is constructed so as to support the tube assembly 5 by this U-shaped groove 42*a*. Considering this construction in relation to the bend direction of the tube assembly 5, the ESD bracket 4 supports the tube assembly 5 toward the bend direction of the tube assembly 5. At the portion of this supporting construction as well, the tube assembly 5 is electrically connected to the ESD bracket 4.

When an operation is performed in which a slider is pressed on the bonding jig while being sucked by the air tweezer 1, a force is applied to the tube assembly 5 in the direction such that the tube assembly 5 is inserted into the U-shaped groove 42*a* of the ESD bracket 4. Therefore, the contact face between the tube assembly 5 and the U-shaped groove 42*a* of the ESD bracket 4 always slides during operation, so that an increase in contact resistance due to oxidation or contamination is prevented.

As described above, for the air tweezer 1 of this embodiment, the sucking pad 6 has conductivity and proper elasticity. Also, the tube assembly 5 is constructed so that stable electrical connection is provided between the tube assembly 5 and the sucking pad 6, and further the electrical connection between the ESD bracket 4 connected to the ground circuit 7 and the tube assembly 5 is also stable, so that the countermeasures against ESD are sufficient.

In order to ensure airtightness as the air tweezer 1, it is effective to seal the connecting portion between the tube assembly 5 and the coupler 2*a* with an adhesive. Also, it is effective to make the connecting portion between the tweezer body 2 and the coupler 2*a* in a tapered shape.

Although a slider is assumed as a sucked article in the above-described embodiment, it is a matter of course that the air tweezer 1 in accordance with the present invention can be applied to suction of any other article.

We claim:

1. An air tweezer comprising:

a tweezer body;

a tube assembly attached to said tweezer body, said tube assembly having a sucking passage; and a sucking pad attached to an end of said tube assembly, said sucking pad having an aperture communicating with said sucking passage;

wherein said tube assembly comprises an outer tube, and an inner tube set on a distal part side in said outer tube, the outer diameter of said inner tube being smaller than the inner diameter of said outer tube; and a stopper tube for inhibiting axial movement of said inner tube is fitted in said outer tube and fixed thereto, said stopper tube abuts on said inner tube, whereby axial movement of said inner tube is inhibited, an electrical conductive route is formed by said stopper tube and said inner tube; and whereby said sucking pad is connected to said outer tube and said inner tube.

2. The air tweezer of claim 1, wherein:

said sucking pad aperture has a first cross-sectional area at said tube assembly which is greater than a second cross-sectional area at an exterior of said sucking pad aperture.

3. The air tweezer of claim 1, wherein:

said sucking pad is electrically conductive; and whereby an electrically conductive route is formed between said sucking pad and said outer tube and between said sucking pad and said inner tube.

4. The air tweezer of claim 1, wherein:

said tweezer body has a bracket, said bracket being electrically connected to said tube assembly, and said bracket being connected to a ground circuit, and said sucking pad is formed of an elastic material, said elastic material including an electrical conductor connected to said tube assembly.

5. The air tweezer of claim 4, wherein said bracket supports said tube assembly.

6. The air tweezer of claim 5, wherein said tube assembly is bent at a predetermined position, and said tube assembly is supported by said bracket toward a bent direction of said tube assembly.

7. The air tweezer of claim 1, wherein said sucking pad is comprised of a matrix phase formed of a rubber material and a conductive material phase formed of carbon powder.

* * * * *